United States Patent
McGee et al.

(10) Patent No.: US 7,058,682 B2
(45) Date of Patent: Jun. 6, 2006

(54) INSTANT MESSAGING BLIND JOIN

(75) Inventors: Jason R. McGee, Apex, NC (US); Michael John Morton, Cary, NC (US); Brent A. Peters, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 684 days.

(21) Appl. No.: 10/202,961

(22) Filed: Jul. 25, 2002

(65) Prior Publication Data

US 2004/0019701 A1    Jan. 29, 2004

(51) Int. Cl.
  G06F 15/16  (2006.01)
  H04L 12/16  (2006.01)
(52) U.S. Cl. .............. 709/204; 709/205; 370/260
(58) Field of Classification Search ......... 709/203, 709/204, 207; 270/360
See application file for complete search history.

(56) References Cited

U.S. PATENT DOCUMENTS

| | | | |
|---|---|---|---|
| 5,880,731 A | 3/1999 | Liles et al. ............ | 345/349 |
| 6,014,136 A | 1/2000 | Ogasawara et al. ...... | 345/331 |
| 6,212,548 B1 | 4/2001 | DeSimone et al. ........ | 709/204 |
| 6,907,447 B1 * | 6/2005 | Cooperman et al. ...... | 709/203 |
| 2001/0003202 A1 * | 6/2001 | Mache et al. ............ | 713/153 |
| 2001/0011351 A1 | 8/2001 | Sako .................... | 713/180 |
| 2001/0013050 A1 | 8/2001 | Shah .................... | 709/20 |
| 2001/0033298 A1 | 10/2001 | Slotznick ............... | 345/758 |
| 2001/0049305 A1 | 12/2001 | Riendeau et al. ........ | 463/42 |
| 2002/0002586 A1 | 1/2002 | Rafal et al. ............ | 709/205 |
| 2002/0007338 A1 | 1/2002 | Do ...................... | 705/37 |
| 2002/0010742 A1 | 1/2002 | Kihara et al. .......... | 709/204 |
| 2002/0016163 A1 | 2/2002 | Burgan et al. .......... | 455/412 |
| 2002/0023132 A1 | 2/2002 | Tomabene et al. ........ | 709/205 |

* cited by examiner

*Primary Examiner*—Jason Cardone
*Assistant Examiner*—Tanim Hossain
(74) *Attorney, Agent, or Firm*—A. Bruce Clay, Esq.; Steven M. Greenberg, Esq.; Christopher & Weisberg, P.A.

(57) ABSTRACT

A blind join apparatus, method and system for use with an instant messaging client. The blind join apparatus can include at least one set of pre-configured blind join options specifying a level of participation permitted by an invitee invited to anonymously join an instant messaging session in progress. Blind join invitation generation logic can be configured to extend a blind join invitation to a specified instant messaging contact. Specifically, the blind join invitation can include a specified invitee and a selected one of the at least one set of pre-configured blind join options. Finally, blind join invitation acceptance logic can be configured to accept a blind join invitation at a level of participation limited by blind join options specified in the blind join invitation.

10 Claims, 4 Drawing Sheets

INSTANT MESSAGING BLIND JOIN

BACKGROUND OF THE INVENTION

1. Statement of the Technical Field

The present invention relates to instant messaging and more particularly to inviting a participant to engage in an on-line chat session.

2. Description of the Related Art

The unparalleled growth of the Internet has led to the development of several new modes of electronic interpersonal communications. Initially, electronic mail (e-mail) provided a mechanism with which correspondents could exchange textual messages in an asynchronous fashion. E-mail technology has since evolved to include the ability both to embed and attach multimedia elements in addition to the textual content. Still, e-mail usage has been limited in respect to the asynchronous nature of e-mail communications. That is, where timing is of no consequence, the delayed responses to messages which are inherent to asynchronous communications do not inhibit the communicative flow of information between correspondents. Where timing is of paramount concern, however, different communicative technologies have been considered.

Specifically, instant messaging systems have become all the rage in network computing. Initially adopted as an aside to chat room technology, instant messaging has since supplanted e-mail as the preferred mode of network communications for real-time on-line conversations. In that regard, instant messaging provides an excellent substitute for short telephone conversations in which minimal to moderate amounts of information are to be related between conversants. Moreover, as messages are communicated instantaneously between participants in an instant messaging session, the delayed responses associated with e-mail no longer can inhibit the flow of conversation between electronic correspondents.

Instant messaging typically involves the disposition of instant messaging clients in the computing devices of respective correspondents. Instant messaging further involves one or more centralized instant messaging servers or centralized or distributed controllers able to manage the flow of data between individual ones of the instant messaging clients. In particular, whether the management of the flow of data between individual instant messaging clients is included as part of the clients in a peer-to-peer system, or as part of a server in a client-server system, the management of the flow of data can include such tasks as tracking the participants in any one instant messaging session, determining whether a particular instant messaging client is on-line and available to participate in a session, and uploading and downloading attachments to instant messages.

As illustrated in FIG. 1, ordinarily, an instant messaging client 110 can present a conversation area 130 in which the text of an on-going conversation in the instant messaging session can be presented. To facilitate the invitation of others to join the instant messaging session, the instant messaging client 110 can include a list of memorized contacts 120 able to participate in instant messaging sessions. Once a session has been initiated, conversants can post messages to the session by entering textual messages in the message posting area 140. Importantly, as it will be apparent by reference to FIG. 1, the contributions of individual conversants in the on-going instant messaging session can be denoted by the identity of the respective individual conversants in the conversation area 130.

Despite the identification of participants in an instant messaging session, there are times when conversant would prefer to observe or participate in an on-line conversation anonymously. For example, in the call center context, many call distribution systems provide functionality for supervisory officials to anonymously monitor the progress of a customer service telephone call. Similarly, in many cases trainees can experience live conversations by anonymously observing the progress of a customer service or sales call. It will be well understood by many that often true opinion can be suppressed for fear of retribution. Thus, anonymous participation in a conversation can facilitate the flow of sincere opinion. Nevertheless, conventional instant messaging technology heretofore has not been configured to allow anonymous participation. Specifically, the very nature of instant messaging clients requires the exposure of the identity of active and potential participants in an instant messaging system.

SUMMARY OF THE INVENTION

The present invention is a blind join apparatus, method and system for use with an instant messaging client. The blind join apparatus can include at least one set of pre-configured blind join options specifying a level of participation permitted by an invitee invited to anonymously join an instant messaging session in progress. Blind join invitation generation logic can be configured to extend a blind join invitation to a specified instant messaging contact. Specifically, the blind join invitation can include a specified invitee and a selected one of the at least one set of pre-configured blind join options. Finally, blind join invitation acceptance logic can be configured to accept a blind join invitation at a level of participation limited by blind join options specified in the blind join invitation. Notably, the set of pre-configured blind join options can include a read-only and a read-write level of participation.

The blind join apparatus can be included as part of an instant messaging system. The system can include an instant messaging session configured to host a plurality of visible participants. The visible participants can post messages in the session, each message having a published association with one of the visible participants. A blind join apparatus can be configured in the system to host at least one anonymous participant in the instant messaging session. Importantly, the anonymous participant can view the posted messages without the visible participants detecting the anonymous participant. The system further can include a blind posting apparatus configured to post messages to the instant messaging session from the anonymous participant along with an anonymous identifier so as to prevent the visible participants from identifying the anonymous participant through messages posted by the blind posting apparatus.

A method of establishing anonymous participation in an instant messaging session can include the steps of: posting messages received from visible participants in the instant messaging session along with identifiers associating each posted message with one of the visible participants; forwarding an invitation to blindly join the instant messaging session to an anonymous participant; and, if the anonymous participant accepts the invitation, forwarding subsequently posted messages to the anonymous participant without notifying the visible participants that the subsequently posted messages have been forwarded to the anonymous participant.

The forwarding step can include constructing an invitation to an anonymous participant to blindly join the instant messaging session; incorporating in the invitation limitations which will be imposed upon the anonymous participant; and, forwarding the invitation to the anonymous participant along with the limitations. The incorporating step can include the step of incorporating a limitation selected from the group consisting of a read-only option and a read/write option. In that regard, if the anonymous participant accepts the invitation and the limitation is a read/write option, subsequent messages received from the anonymous participant can be posted in the instant messaging system without identifiers which can be used to identify the anonymous participant.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a blind join method and apparatus for use in an instant messaging client. In accordance with the present invention, one or more participants in an instant messaging session can invite a new participant to join the instant messaging session in an anonymous fashion. Specifically, though the new participant may view the messages of the participants to the session, and optionally post messages to the session, the identity of the new participant can remain shielded from all participants in the session. Thus, the new participant can "blindly join" the instant messaging session.

Figure 1:
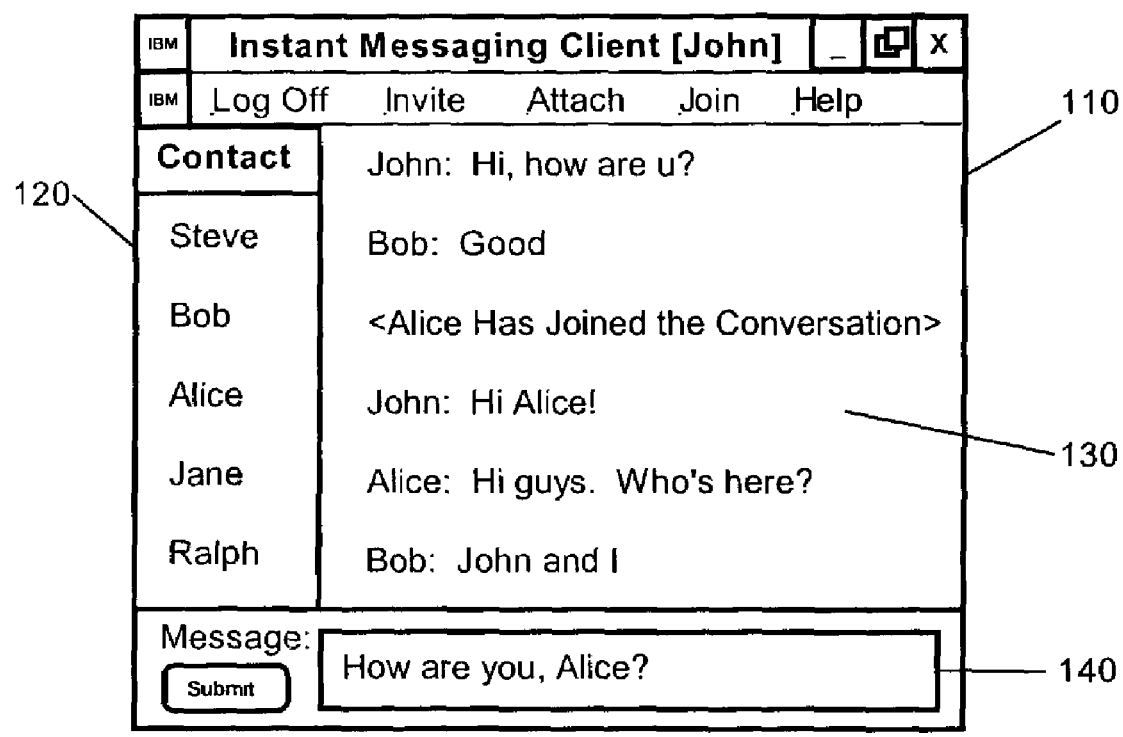
FIG. 1 is a pictorial illustration of an instant messaging client known in the art.
Figure 2A:
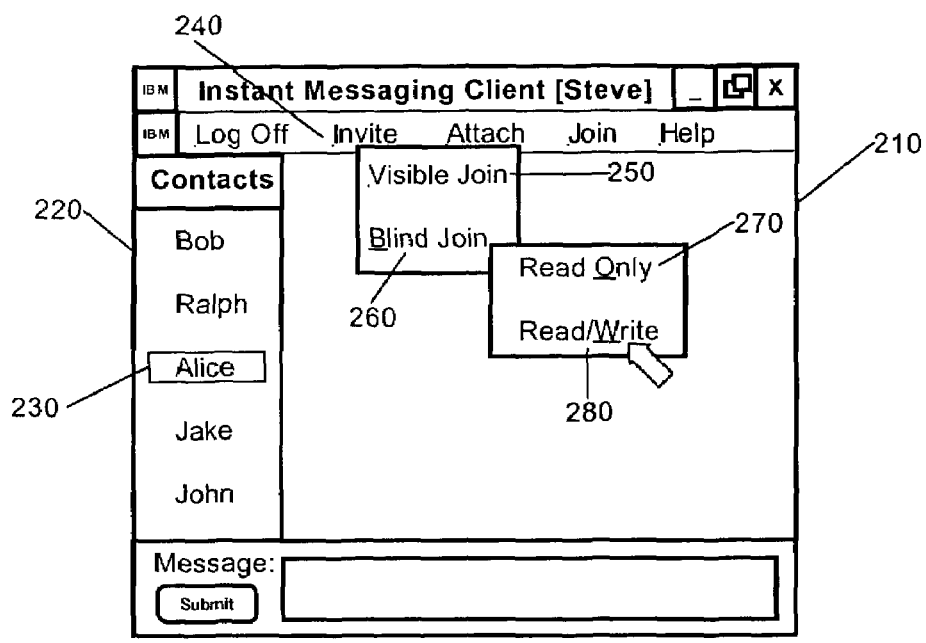
FIG. 2A is a pictorial illustration of an exemplary instant messaging client which has been configured with the blind join apparatus of the present invention.

FIG. 2A is a pictorial illustration of an exemplary instant messaging client 210 which has been configured with the blind join apparatus of the present invention. As shown in FIG. 2A, the instant messaging client 210 not only can include typical instant messaging client components such as a contact list 220, but also the instant messaging client can include a user interface linked to the blind join apparatus of the present invention. For example, as shown by way of illustration in FIG. 2A, an INVITE menu entry 240 can be configured with both a visible join menu choice and a blind join menu choice 260.

Upon selecting the blind join menu choice 260, a sub-menu can be provided which can present both a read-only option 270 and a read/write option 280. Depending upon the chosen sub-menu option 270, 280, a selected contact 230 in the contact list 220 can be invited to anonymously join the instant messaging session with the option either to both view and post messages to the session, or to only view messages posted by others in the session. Still, as will be recognized by one skilled in the art, the invention is not limited strictly to the user-interface illustrated for inviting a selected contact to anonymously participate in an instant messaging system. Rather, any user-interface schema can suffice, including the presentation of a dialog box in which the contact, visible join/blind join menu options and sub-menu options can be consolidated.

Figure 2B:
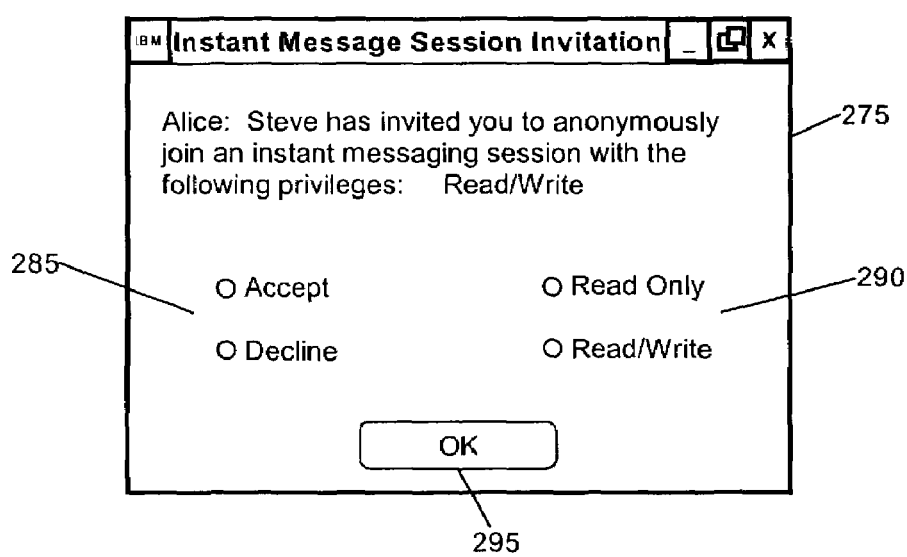
FIG. 2B is a pictorial illustration of an exemplary dialog box notifying an invitee of a blind join invitation generated in the exemplary instant messaging client of FIG. 2A.

Regardless of the mechanism for identifying a invitee and specifying the type of invitation and corresponding join parameters, once the contact 230 has been selected to blindly join the instant messaging session, for example, with the right to both view and post messages in the session, notification can be provided to the invitee that an invitation to blindly join the instant messaging session has been extended thereto. FIG. 2B is a pictorial illustration of an exemplary dialog box notifying an invitee of a blind join invitation.

As shown in FIG. 2B, the notification 275 can be a dialog box through which the invitee can be notified that a particular participant in an instant messaging session has invited the invitee to anonymously join the instant messaging session. The notification 275 further can specify the type of access rights afforded to the invitee, should the invitee accept the invitation. The invitee can be prompted with a suitable interface element 285, whether or not to accept the invitation. Furthermore, the invitee can be prompted with another suitable interface element 290 whether to accept the access rights specified according to the invitation, or whether to opt for lesser rights. In any case, the invitee can submit the response through yet another interface element 295.

Figure 3:
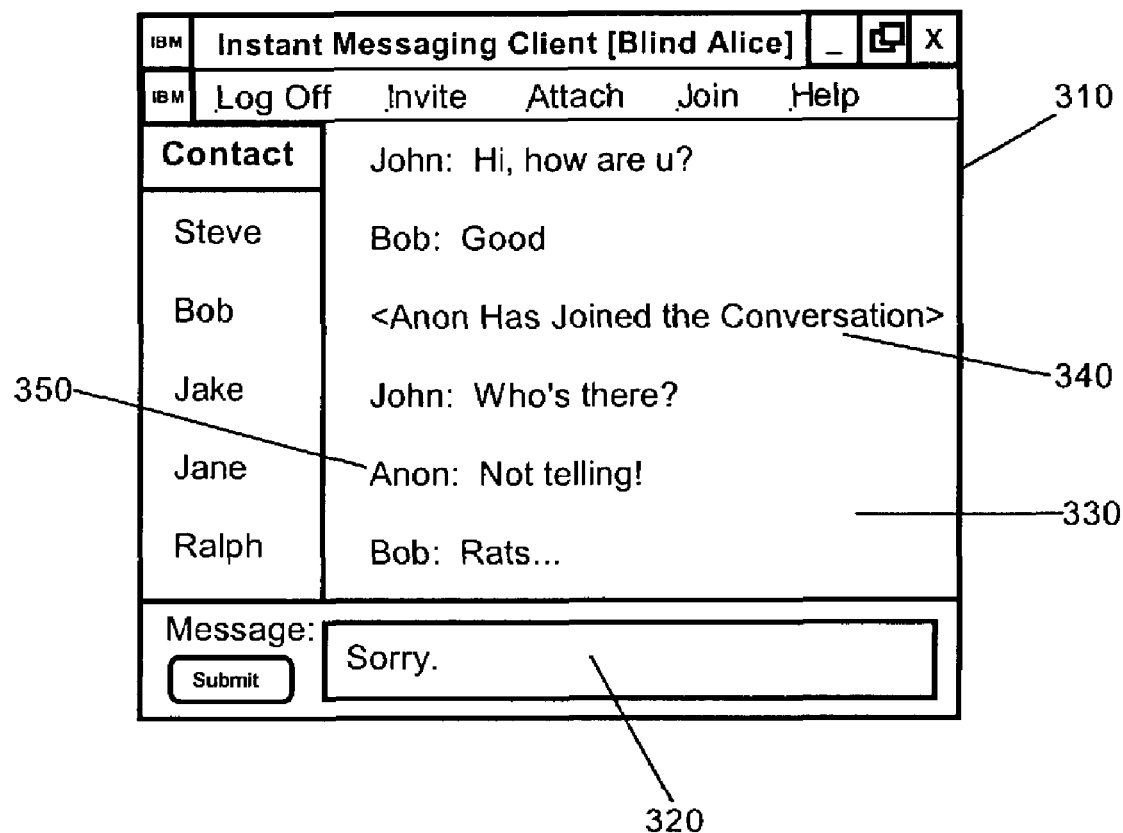
FIG. 3 is a pictorial illustration of an exemplary instant messaging client configured for anonymous participation in the instant messaging session of FIG. 2A; and, FIG. 4 is a block illustration of an instant messaging system in which the blind join apparatus of the present invention has established the anonymous participation of a particular invitee.

FIG. 3 is a pictorial illustration of an exemplary instant messaging client configured for anonymous participation in the instant messaging session of FIG. 2A. Once the invitee has accepted an offer to blindly join an instant messaging session as an anonymous participant, the instant messaging client 310 of the anonymous participant can provide an interface element 330 in which the postings 340 of participants in the instant messaging session can be viewed. To the extent that the invitee had been afforded merely read-only privileges, the invitee can view the postings 340 through the interface element 330 without the knowledge of the participants in the instant messaging session.

By comparison, to the extent that the invitee both had been afforded and accepted read/write privileges, the invitee both can view the postings 340 through the interface element 330, and also the invitee can anonymously post messages to the instant messaging session. Specifically, though the invitee can enter messages using the message posting area 320, the actual message displayed in the interface element 330 will not specifically identify the invitee as anything other than anonymous. In that regard, in the example shown in FIG. 3, the message posted by the invitee is labeled by the alias 350, "Anon". Still, one skilled in the art will recognize that an anonymous alias is not limited to the label, "Anon". Rather, in other embodiments, the label can be some other non-specific term, or can be a term selected by any user to denote the anonymous participation of the invitee, such as "manager", "supervisor", "operator", and the like.

One of ordinary skill in the art will recognize that the pictorial illustrations of FIGS. 2A, 2B and 3 merely depict a single one of the multitude of possible user interfaces through which the blind join apparatus can operate. In fact, though a windowing system implementation has been specifically illustrated, the invention is not so limited and a pure, textually based instant messaging client, for instance, can equally suffice. In this regard, FIG. 4 is a block illustration of an instant messaging system in which the blind join apparatus of the present invention has established the anonymous participation of a particular invitee, regardless of the user interface elements employed during the process.

Figure 4:
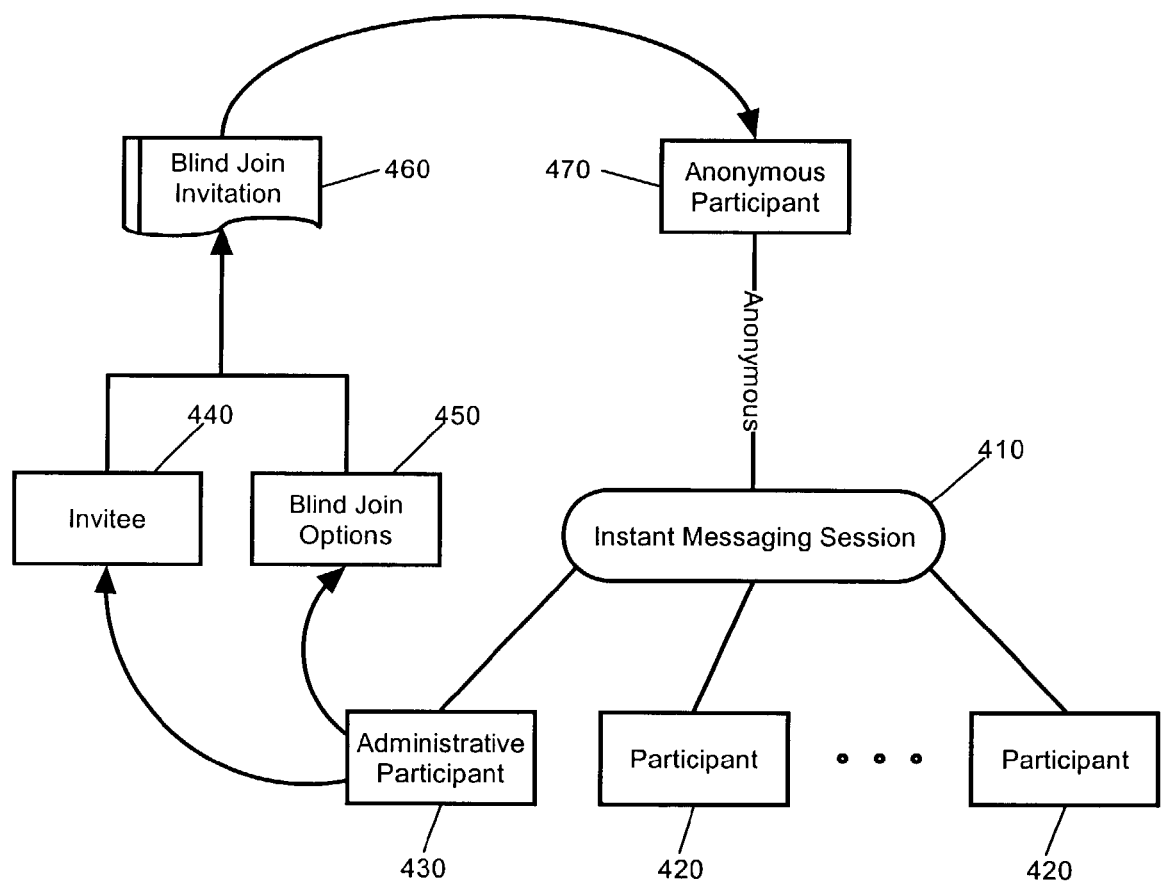

As shown in FIG. 4, one or more participants 420 can engage in an instant messaging session 410 in which the presence of each participant 420 is known to each other participant as are the postings of each participant 420. One or more of the participants can be an administrative participant 430. The administrative participant 430 can extend invitations to invitees to participate in the instant messaging session 410. Moreover, in accordance with the present invention, the administrative participant 430 can extend blind join invitations 460 to anonymous participants 470. Still, though the ability to extend invitations has been limited by way of example to administrative participants 430, the invention is not so limited and in other aspects of the present invention, some or all participants to an instant messaging session can extend both visible and blind join invitations.

In any case, in accordance with a preferred arrangement, the administrative participant 430 can specify both an invitee 440 and one or more blind join options 450, such as read-only privileges, or read-write privileges. In consequence, a blind join invitation 460 can be forwarded to the anonymous participant 470 specified as the invitee 440 along with the specified blind join options 450. When the anonymous participant 470 accepts the invitation 460 according to the specified blind join options 450, the anonymous participant 470 at least can view the postings of the participants 420, 430 in the instant messaging session 410, and depending upon the specified blind join options 450, can post messages anonymously to the instant messaging session 410.

The present invention can be realized as an instant messaging client, or as a plug-in to or an extended feature of an instant messaging client. The present invention further can be realized either in hardware, software or firmware, in a centralized fashion in one computer system, or in a distributed fashion where different elements are spread across several interconnected computer systems. Any kind of computer system, or other apparatus adapted for carrying out the methods described herein, is suited to perform the functions described herein. A typical centralized implementation could include a general purpose computer system with a computer program that, when being loaded and executed, controls the computer system such that it carries out the methods described herein.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A blind join apparatus for use with an instant messaging client, the blind join apparatus comprising:
   at least one set of pre-configured blind join options specifying a level of participation permitted by an invitee invited to anonymously join an instant messaging session in progress;
   blind join invitation generation logic configured to
      receive a selection of one of said at least one set of pre-configured blind join options by a present participant of said instant messaging session in progress, and
      extend a blind join invitation to a specified instant messaging contact, said blind join invitation comprising a specified invitee and said selected one of said at least one set of pre-configured blind join options; and,
   blind join invitation acceptance logic configured to accept a blind join invitation at a level of participation limited by blind join options specified in said blind join invitation.

2. The blind join apparatus of claim 1, wherein said at least one set of pre-configured blind join options comprise a read-only and a read-write level of participation.

3. A method of establishing anonymous participation in an instant messaging session comprising the steps of:
   posting messages received from visible participants in the instant messaging session along with identifiers associating each posted message with one of said visible participants;
   forwarding an invitation from a participant in the instant messaging sessions to an invitee to blindly join the instant messaging session; and,
   if said invitee accepts said invitation, forwarding subsequently posted messages to said invitee without notifying said visible participants that said subsequently posted messages have been forwarded to said invitee.

4. The method of claim 3, wherein said forwarding step comprises the steps of:
   constructing an invitation to said invitee to blindly join the instant messaging session;
   incorporating in said invitation limitations which will be imposed upon said invitee; and,
   forwarding said invitation to said invitee along with said limitations.

5. The method of claim 3, wherein said incorporating step comprises the step of incorporating a limitation selected from the group consisting of a read-only option and a read/write option.

6. The method of claim 5, further comprising the step of, if said invitee accepts said invitation and said limitation is a read/write option, posting in the instant messaging session subsequent messages received from said invitee without identifiers which can be used to identify said invitee.

7. A machine readable storage having stored thereon a computer program for establishing anonymous participation in an instant messaging session, said computer program comprising a routine set of instructions for causing the machine to perform the steps of:
   posting messages received from visible participants in the instant messaging session along with identifiers associating each posted message with one of said visible participants;
   forwarding an invitation from a participant in the instant messaging sessions to an invitee to blindly join the instant messaging session; and,
   if said invitee accepts said invitation, forwarding subsequently posted messages to said invitee without notifying said visible participants that said subsequently posted messages have been forwarded to said invitee.

8. The machine readable storage of claim 7, wherein said forwarding step comprises the steps of:
- constructing an invitation to said invitee to blindly join the instant messaging session;
- incorporating in said invitation limitations which will be imposed upon said invitee; and,
- forwarding said invitation to said invitee along with said limitations.

9. The machine readable storage of claim 7, wherein said incorporating step comprises the step of incorporating a limitation selected from the group consisting of a read-only option and a read/write option.

10. The machine readable storage of claim 9, further comprising the step of, if said invitee accepts said invitation and said limitation is a read/write option, posting in the instant messaging session subsequent messages received from said invitee without identifiers which can be used to identify said invitee.

* * * * *